United States Patent [19]

Mizuno et al.

[11] Patent Number: 4,848,853

[45] Date of Patent: Jul. 18, 1989

[54] HYDRAULIC BRAKE SYSTEM

[75] Inventors: Genji Mizuno, Toyoake; Michiharu Nishii, Toyota; Yoshihiko Tada, Hazu; Yoshihisa Nomura, Toyota; Masahiko Kato, Nogaya; Kenji Shirai, Mishima; Junichi Tanoue, Susono, all of Japan

[73] Assignee: Aisin Seiki Kabushiki Kaisha, Aichi, Japan

[21] Appl. No.: 259,743

[22] Filed: Oct. 19, 1988

[30] Foreign Application Priority Data

Oct. 19, 1987 [JP] Japan .................. 62-263548

[51] Int. Cl.$^4$ .................. B60T 8/64; B60T 8/44; B60T 8/48

[52] U.S. Cl. .................. 303/110; 188/358; 303/114; 303/119

[58] Field of Search .............. 303/110, 113, 114, 116, 303/119, 117, 10, 13; 60/545, 547.1; 188/358, 359, 181 A, 181 R; 180/197, 244

[56] References Cited

U.S. PATENT DOCUMENTS

| | | | |
|---|---|---|---|
| 4,565,411 | 1/1986 | Seiber | 303/114 X |
| 4,630,871 | 12/1986 | Imoto et al. | 303/114 X |
| 4,637,662 | 1/1987 | Brown | 303/116 X |
| 4,643,487 | 2/1987 | Neubrand | 303/119 X |
| 4,729,611 | 3/1988 | Kircher et al. | 303/119 X |
| 4,730,877 | 3/1988 | Seibert et al. | 303/119 X |
| 4,743,075 | 5/1988 | Belart et al. | 303/100 X |
| 4,746,174 | 5/1988 | Buschmann | 303/110 |
| 4,778,225 | 10/1988 | Rudolph et al. | 180/244 X |
| 4,778,226 | 10/1988 | Brown | 303/110 X |
| 4,786,118 | 11/1988 | Burgdorf et al. | 303/116 X |
| 4,805,965 | 2/1989 | Jonner et al. | 180/244 X |
| 4,807,942 | 2/1989 | Belart | 303/114 |

Primary Examiner—Douglas C. Butler
Attorney, Agent, or Firm—Burns, Doane, Swecker & Mathis

[57] ABSTRACT

A hydraulic brake system includes a master cylinder for generating a brake fluid pressure in response to a brake pedal, a power fluid source for generating a power fluid pressure by increasing a brake fluid to a predetermined pressure. A dynamic fluid pressure control apparatus supplies the brake fluid pressure to regulate the power fluid pressure from the power fluid pressure source in response to the brake pedal. A plurality of wheel cylinders of each wheel for the vehicle are fluidically communicated with a dynamic fluid pressure control apparatus and the master cylinder via a fluid passage separated into plural control systems. A first changeover valve fluidically and selectively communicates at least one system of the wheel cylinder with one of the dynamic fluid pressure control apparatus and the master cylinder and a control valve disposed in a fluid passage communicates the first changeover valve and the wheel cylinder controls the brake fluid pressure supplied to the wheel cylinder by opening and closing the fluid passage in accordance with the slip state of the wheel upon braking. A control circuit controls the actuation of the control valve and the first changeover valve, and a second changeover valve is disposed in a fluid passage fluidically communicating the first changeover valve and the dynamic fluid pressure control apparatus and selectively communicates the fluid passage with one of the dynamic fluid pressure control apparatus and the power fluid pressure source.

3 Claims, 4 Drawing Sheets

HYDRAULIC BRAKE SYSTEM

BACKGROUND OF THE INVENTION

1. Field of the Invention

The present invention relates to a hydraulic brake system for vehicles, and more particularly to a hydraulic brake system for vehicles which is provided with a slip preventing apparatus.

2. Description of the Prior Art

A hydraulic brake control system is utilized for supplying the brake fluid pressure in response to the actuation of a brake pedal as an output. A master cylinder, namely a static hydraulic control apparatus, supplies the brake fluid pressure in response to the brake pedal as an output by the input of the brake fluid of the reservoir and a dynamic fluid pressure control apparatus supplies the brake fluid pressure regulated in response to the brake pedal as an output by the input of a power fluid pressure and which is provided with a power fluid pressure source.

A hydraulic booster has been proposed as the dynamic fluid pressure control apparatus, namely, a booster apparatus which can boost the master cylinder in response to the brake pedal as a boosting source of the power fluid pressure, so that the brake fluid pressure within the hydraulic booster is directly supplied to the wheel cylinder of the wheel. A slip preventing apparatus of the wheel, i.e., an antiskid apparatus, is provided and it is proposed to use the boost fluid pressure as a control pressure. This is disclosed, for example, in Japanese Patent Publication No. 56(1981)- 10219.

As described in Japanese Patent Laid Open Publication No. 60(1985)-38243, a boost fluid pressure is applied upon normal braking actuation and the stroke of the brake pedal is reduced. When a slip preventing apparatus is actuated, a boost fluid pressure circuit is blocked and brake fluid pressure within a wheel cylinder is decreased and increased by a valve apparatus so as to prevent lock of the wheel (hereinafter, anti-lock function).

If a braking force is supplied to a driven wheel, independent of the actuation of the brake pedal, in order to prevent the slip of the driven wheel upon the start or acceleration of the vehicles and the boost fluid pressure to the slip preventing apparatus is blocked so as to maintain a suitable rotational state of the driven wheel and a power fluid pressure source is directly communicated with the wheel cylinder of the driven wheel, an anti-slip function is provided. This function means the slip preventing apparatus from the point of view of the slip prevention of the wheel. That is to say, the brake force is automatically supplied to the driven wheel independent of the actuation of the brake pedal so that it is different from the slip preventing apparatus of the braking during the anti-lock function. However, it does not cooperate with the actuation of the brake pedal, so that the boost fluid pressure is not generated and a new independent brake fluid pressure source is required. The fluid pressure control can utilize the valve apparatus of the conventional slip preventing apparatus, so that the power fluid pressure source (auxiliary pressure source) is fluidically communicated wit the wheel cylinder of the driven wheel by a changeover valve. An example of such a simple construction is shown by Japanese Patent Laid Open Publication No. 60(1985)-38243.

Accordingly, the boost fluid pressure of the hydraulic booster is supplied to the wheel cylinder by the master cylinder upon the anti-lock control and the power fluid pressure is supplied to the wheel cylinder upon the anti-slip control by the above-mentioned changeover valve in the above mentioned prior art. Accordingly, a situation may arise where the power fluid pressure is supplied to the master cylinder at a transitional state of the changing and the reaction force acts on the brake pedal. This can not be avoided for the construction of the changeover valve, for example, of the type shown in FIG. 4. Therein, valve members 103, 104 mounted on both ends of the sliding direction of a plunger 102, slidably moved within a housing 101, are seated on one of seat members 105, 106 oppositely provided to the valve members 103, 104. In an electromagnetic valve 100 constructed as a changeover valve by the energization or deenergization of a solenoid 107, the communication between ports 108, 109 and ports 108, 110 is selectively attained. It may be happened that the valve members 103, 104 are separated from the seat members 105, 106 during transition of the changeover. However, as the anti-slip control is performed independent of the actuation of the brake pedal, the foregoing situation should not be permitted to occur. When the electromagnetic valve used as a changeover valve has a small energization requirement due to the miniaturization of the electromagnetic valve, there is the possibility for a delay of the response. In order to prevent the problem, a large number of open-close valves are used and the open-close state is maintained during the change, however, as the number of valves apparatus is increased the control system will be unduly complicated.

SUMMARY OF THE INVENTION

According to the present invention, a hydraulic brake system includes a master cylinder for supplying a brake fluid pressure in response to a brake pedal as an output, a power fluid pressure source supplying a power fluid pressure as an output by increasing brake fluid to a predetermined pressure, a dynamic fluid pressure control apparatus supplying the brake fluid pressure regulates the power fluid pressure from the power fluid pressure source in response to the brake pedal, wheel cylinders of each wheel of the vehicle fluidically communicated with the dynamic fluid pressure control apparatus and the master cylinder via a fluid passage separated into plural systems. A first changeover valve is provided for fluidically and selectively communicating at least one system of the wheel cylinder with one of the dynamic fluid pressure control apparatus and the master cylinder, a control valve disposed in a fluid passage communicates the first changeover valve and the wheel cylinder and controls the brake fluid pressure supplied to the wheel cylinder by opening and closing the fluid passage in accordance with the slip state of the wheel during braking operation, a control circuit for controlling the actuation of the control valve and the first changeover valve, and a second changeover valve disposed in a fluid passage fluidically communicating the first changeover valve and the dynamic fluid pressure control apparatus and selectively communicating the fluid passage with one of the dynamic fluid pressure control apparatus and the power fluid pressure source.

Accordingly, it is an object of the present invention to provide a hydraulic brake system in which the change to a power fluid pressure source during an anti-slip control operation can be smoothly and surely attained.

BRIEF DESCRIPTION OF THE DRAWINGS

The above stated objects and following description will become readily apparent with reference to the accompanying drawings, wherein like reference numerals denote like elements, and in which.

DETAILED DESCRIPTION OF THE PREFERRED EMBODIMENTS

Figure 1:
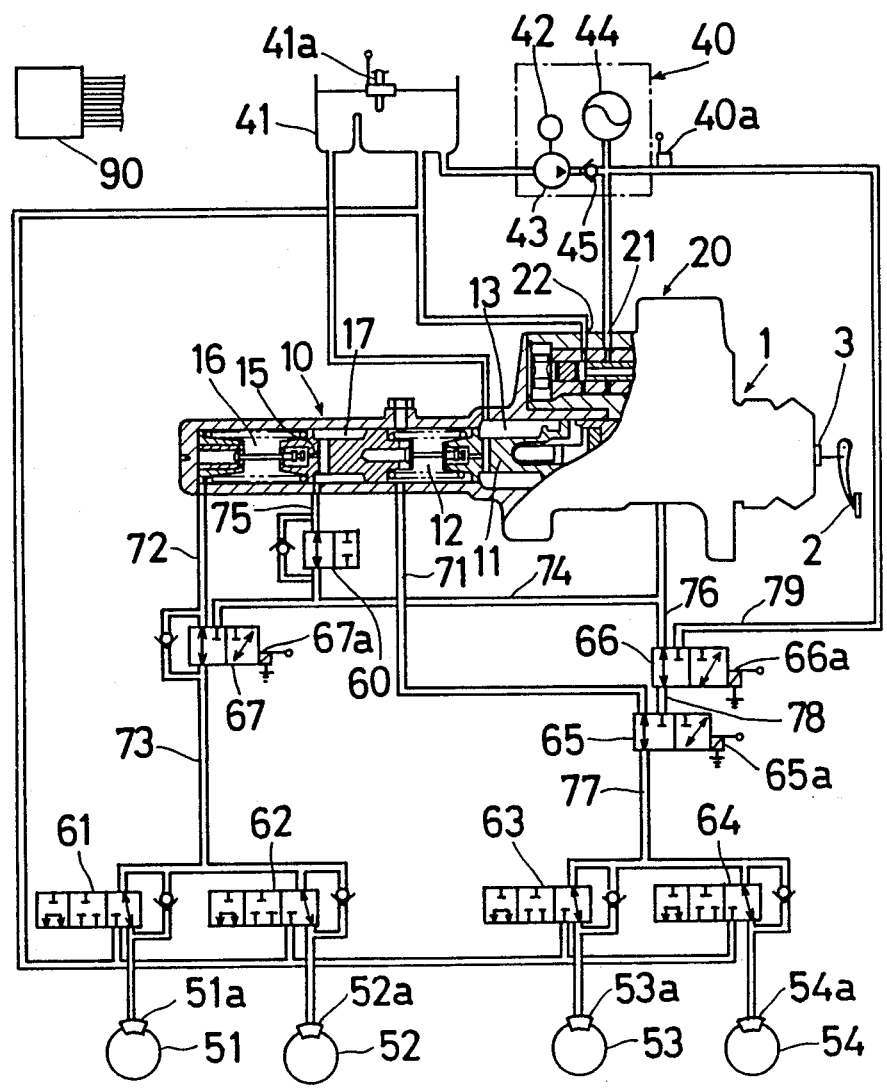
FIG. 1 is a schematic view of a first embodiment of a hydraulic brake system according to the present invention.

FIG. 1 shows a first embodiment of the present invention in which a hydraulic brake control apparatus 1 is provided with a tandem master cylinder 10 and a dynamic hydraulic booster 20 so as to provide a dynamic hydraulic control apparatus. Thus, the depressing force applied to a brake pedal 2 is transmitted as a brake actuating force through an input rod 3. A brake hydraulic pressure supplied from a reservoir 41 or a power hydraulic source 40 is suitably controlled and is supplied to wheel cylinders 51a to 54a of front and rear wheels 51 to 54 via first and second hydraulic passages 71, 72.

The tandem master cylinder 10 is provided with first and second pistons 11, 15 and transmits the brake fluid supplied from the reservoir 41, through a first hydraulic chamber 13 to a first pressure chamber 12 via the first piston 11. The first piston 11 is slidably moved in response to the brake pedal 2 so as to compress the first pressure chamber 12. The brake fluid pressure is then supplied to the first hydraulic passage 71 as an output and the second piston 15 is slidably moved and the second pressure chamber 16 is compressed, so that the brake fluid pressure is communicated to the second hydraulic passage 72. A second hydraulic chamber 17 of the second piston 15 is fluidically communicated with the hydraulic booster 20 via a fifth hydraulic passage 75, normally opened open-close valve 60, and fourth hydraulic passage 74. When the output fluid pressure of the hydraulic booster 20 is supplied thereto, the fluid pressure is supplied to the second hydraulic passage 72 via the second pressure chamber 16.

The hydraulic booster 20 regulates a power fluid pressure in response to movement of the brake pedal 2. The power fluid pressure supplied by the power fluid pressure source 40 communicates with a port 21 as an output and drives the tandem master cylinder 10 in a boosting manner.

A port 22 communicates with the reservoir 41 and any excess brake fluid is returned to the reservoir 41 upon stopping or after reaching a predetermined boosting pressure.

The power fluid pressure source 40 is provided with a hydraulic pump 43 driven by an electric motor 42. An input side of the power fluid pressure source 40 is fluidically communicated with the reservoir 41 and an output side thereof with an accumulator 44 via a check valve 45, so that the brake fluid increased in pressure within the hydraulic pump 43 and is supplied as a power fluid pressure via the accumulator 44. Reference numeral 40a is a pressure switch and 41a is a fluid quantity sensor.

The first pressure chamber 12 of the tandem master cylinder 10 is fluidically communicated with wheel cylinders 53a, 54a of rear wheels 53, 54 as a driven wheel via a first fluid passage 71, first changeover valve 65, seventh fluid passage 77 and control valves 63, 64. The second pressure chamber 16 is fluidically communicated with wheel cylinders 51a, 52a of front wheels 51, 52 via a second fluid passage 72, third changeover valve 67, third fluid passage 73, and control valves 61, 62. The hydraulic booster 20 is fluidically communicated with the third changeover valve 67 via a fourth fluid passage 74 and is fluidically communicate with the second fluid chamber 17 of the tandem master cylinder 10 via an open-close valve 60 and a fifth fluid passage 75. The power fluid pressure source 40 is fluidically communicated with a second changeover valve 66 via a ninth fluid passage 79.

The first changeover valve 65 is constructed by a three port-two position electromagnetic valve driven by a solenoid 65a and fluidically communicates first and seventh fluid passages 71, 77 and takes a first position for blocking an eighth fluid passage 78 in a normal state, and fluidically communicates seventh and eighth fluid passages 77, 78 and takes a second position for blocking the first fluid passage when in an actuated state.

A second changeover valve 66 is constructed by a three port-two position electromagnetic valve driven by a solenoid 66a and blocks a ninth fluid passage 79 and fluidically communicates sixth and eighth fluid passages 76, 78 and fluidically communicates the first changeover valve 65 to the hydraulic booster 20 in a normal state, and blocks the sixth fluid passage 76 and fluidically communicates eighth and ninth fluid passages 78, 79 and fluidically communicates the first changeover valve 65 with the power fluid pressure source 40, in an actuated state.

The third changeover valve 67 is constructed by a three port-two position electromagnetic valve driven by a solenoid 67a and normally located a position shown in FIG. 1, and fluidically communicates third and fourth fluid passages 73, 74 and fluidically communicates with the hydraulic booster 20.

The first, second, and third changeover valves 65, 66, 67, are controlled by a control circuit 90. Upon actuation of the anti-lock control, first and third changeover valves 65, 67 are actuated while the second changeover valve 66 is not actuated, and upon actuation of the anti-slip control, the first changeover valve 65 is at first actuated and then the second changeover valve 65 is actuated while the third changeover valve 67 is not actuated.

The open-close valve 60 is constructed as a two-port two-position electromagnetic valve and normally fluidically communicates with the fifth fluid passage 75. When the amount of the brake fluid is insufficient, for example, as sensed by the sensor 41a by an output signal of the sensor 41a of the fluid amount available at the reservoir 41 or the control circuit 90 is supplied with an output signal of the pressure sensor 40a, the open-close valve 60 is closed, or in case that the pressure sensor 40a indicates a decrease of the power fluid pressure, the open-close valve 60 is closed.

Control valves 61, 62 are three-port, three-position electromagnetic valves and fluidically communicate with wheel cylinders 51a, 52a and with the third changeover valve 67 at the first position and blocks communication at the second position, and fluidically communicates with the reservoir at the third position. The normal brake actuation is performed at the first position and the brake fluid pressure is selectively regulated at first to third positions upon the anti-lock actuation. Control valves 63, 64 are fluidically communicated with wheel cylinders 53a, 54a of the rear wheels 53, 54.

In the first embodiment, open-close valve 60, first to third changeover valves 65, 66, 67, and control valves 61 to 64 are positioned as shown in FIG. 1 and brake operation is attained at the front wheels 51, 52 by the output fluid pressure of the hydraulic booster 20 and at the rear wheels 53, 54 by the output fluid pressure of the first pressure chamber 12.

Next, when the slip state or condition of the wheel is sensed upon brake actuation, the anti-lock control feature is initiated. First and third changeover valves 65, 67 are actuated by the control circuit 90, the output fluid pressure of the hydraulic booster 20 is supplied to control valves 61 and 64 and the three positions of each control valve 61 to 64 are suitably selected so as to direct the fluid pressure to the wheel cylinders 51a to 54a.

When the slip of a driven wheel of the rear wheels 53, 54 is sensed in the control circuit 90 upon the starting or acceleration of vehicles, the first changeover valve 65 is actuated and the first fluid passage 71 is blocked. Then, the second changeover valve 66 is actuated and the power fluid pressure is supplied to wheel cylinders 53a 54a. That is to say, the brake force is supplied to rear wheels 53, 54 regardless of the brake pedal 2 and control valves 63, 64 are controlled by the control circuit 90 and the brake fluid pressure of wheel cylinders 53a, 54a is increased, decreased or maintained in accordance with the sensed slip condition. Accordingly, excess rotation of the wheel is stopped and slip is prevented.

As above mentioned, the power fluid pressure from the power fluid pressure source 40 is blocked by the second changeover valve 66 until the first changeover valve 65 is actuated. When the first changeover valve 65 is actuated, the hydraulic booster 20 is at first fluidically communicated with wheel cylinders 53a, 54a and the first fluid passage 71 is blocked, so that the power fluid pressure source 40 is not fluidically communicated with the first fluid passage 71. When one of the first and second changeover valves 65, 66 is not actuated, the power fluid pressure is not supplied to the seventh fluid passage 77, so that a fail-safe operation is provided by the combination of the changeover valves.

When the output fluid pressure of the hydraulic booster 20, for example, is lost or decreased by losses of the power fluid pressure of the power pressure source 40, or when leakage of the fluid is generated at the side of wheel cylinders 51a, 52a, the brake force is maintained by the cooperation of first and third changeover valves 65, 67 and the open-close valve 60. The control system has an effective function as a fail-safe system. That is to say, the first and third changeover valves 65 and 67 are not actuated. Accordingly, the brake operation of front and rear wheels is performed by the actuation of the tandem master cylinder 10.

When the brake fluid in the reservoir 41 is decreased by leakage of the fluid, this is sensed by the sensor 41a as a fluid amount sensor and the open-close valve 60 is opened by the control circuit 90. At this time, if it is during the anti-lock control, the anti-lock control is stopped and first and third changeover valves 65, 67 are not actuated and the central valves are in the position as shown in FIG. 1. Accordingly, the brake force is maintained at wheel cylinder 53a, 54a by the brake fluid pressure from the firs pressure chamber 12 and the leakage of the fluid at wheel cylinders 51a, 52a is blocked by the open close valve 60 and the output fluid pressure of the hydraulic booster 20 is blocked by the open-close valve 60, second and third changeover valves 65, 66 so that the outflow is blocked. As a result, the boost actuation is maintained to the tandem master cylinder 10.

Figure 2:
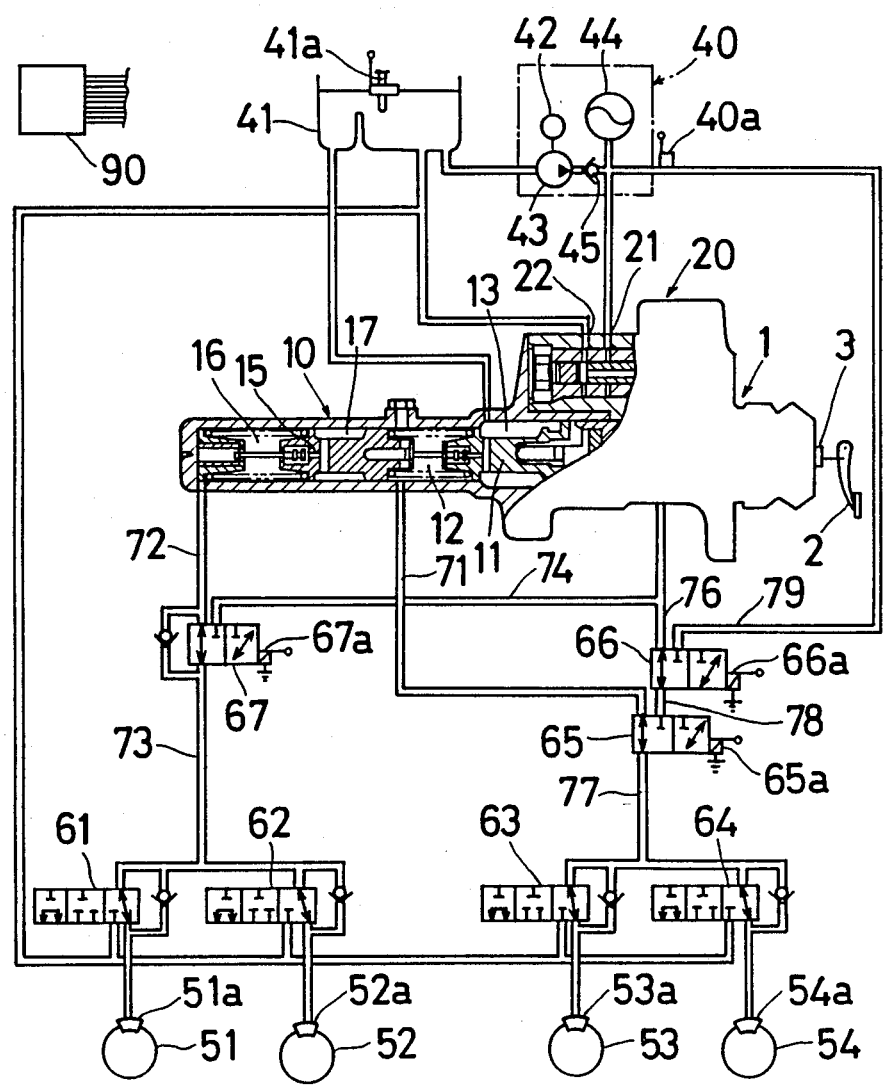
FIG. 2 is a view similar to FIG. 1, however, showing a second embodiment of a hydraulic brake system according to the present invention.

FIG. 2 shows a second embodiment of the present invention and same numerals are attached to the same portion with the first embodiment of FIG. 1 and different portions from the first embodiment are described hereinafter:

In this second embodiment, the second fluid chamber 17 of the tandem master cylinder 10 is fluidically communicated with the reservoir 41, so the open-close valve 60 is eliminated and brake actuation is performed by the fluid pressure control of the tandem master cylinder 10 except during the operation of the anti-lock control and the anti-slip control. The other construction, operation and effect are same with the first embodiment excepting for the difference of the open-close valve and the fifth fluid passage 75. Accordingly, it is omitted from the description.

Figure 3:
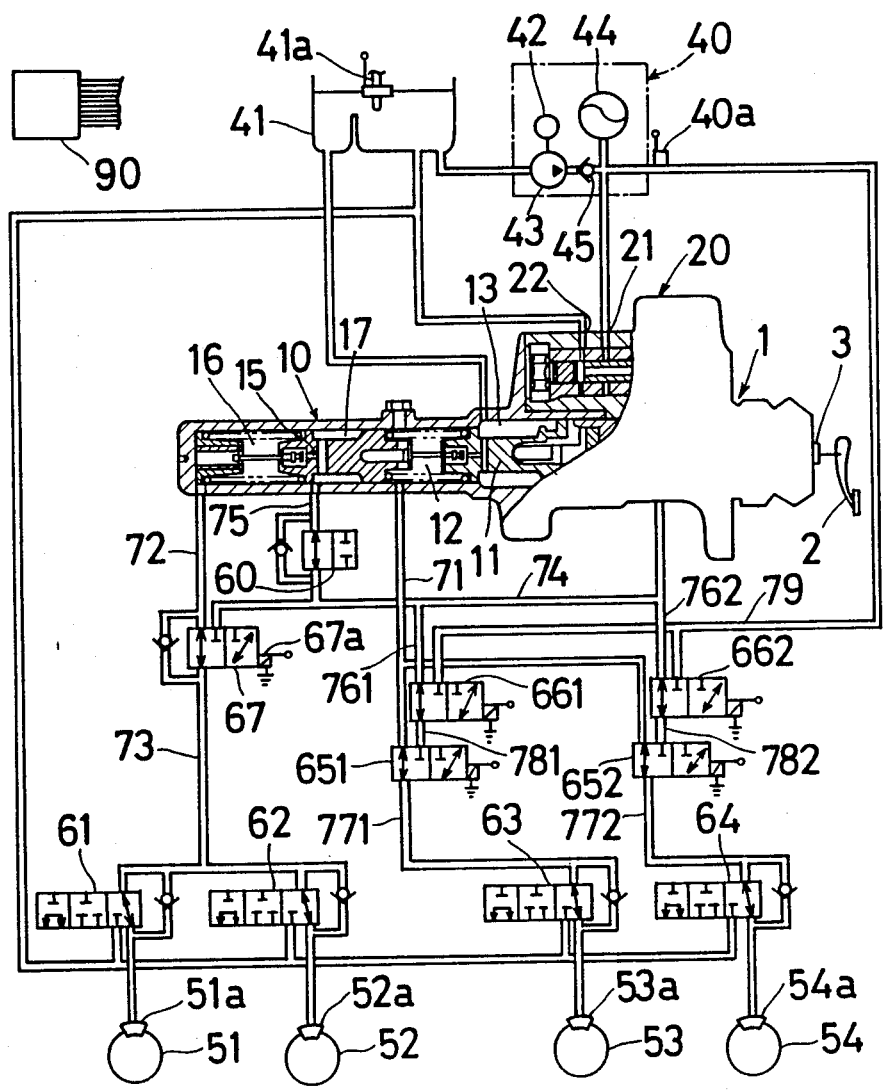
FIG. 3 is a view similar to FIG. 1, however, showing a third embodiment of a hydraulic brake system according to the present invention.
Figure 4:
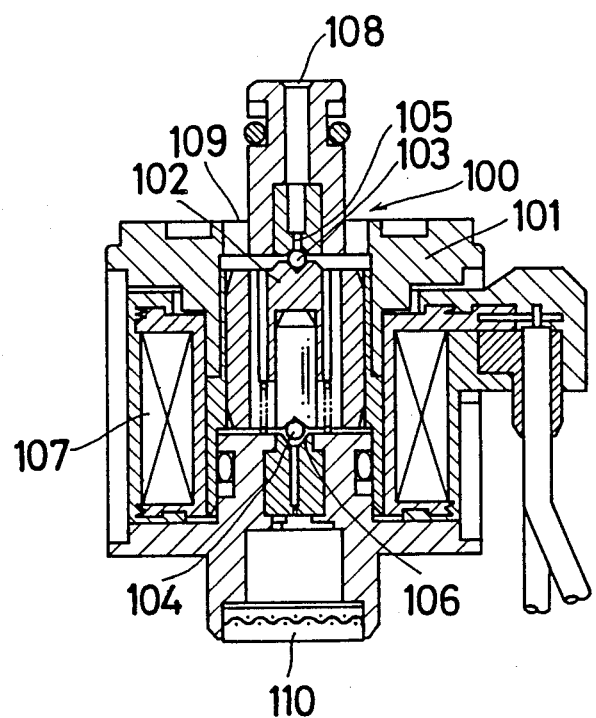
FIG. 4 is a sectional view of a conventional changeover valve.

FIG. 3 is a third embodiment of the present invention and same numerals are attached to the same portion with the first embodiment of FIG. 1. The sides of rear wheels 53, 54 are further separated into two systems and first changeover valves 651, 652 and second changeover valves 661, 662 are provided for each side. These first and second changeover valves 651, 652, 661, 662 have the same construction and are similarly actuated with first and second changeover valves 65, 66 in FIG. 1. Fluid passages 761, 762, 771, 772, 781, 782 correspond to fluid passages 76, 77, 78 of the first embodiment and are fluidically communicated with first changeover valves 651, 652, second changeover valves 661, 662 by separating fluid passages 71, 79 in the first embodiment. The other construction, operation and effect are same as the first embodiment, so that the description thereof is omitted.

The hydraulic booster 20 is used as a dynamic fluid pressure control apparatus in the above mentioned embodiments 1 to 3, however, it is possible to provide a system such that a vacuum-type booster is used as a booster, and a pressure regulating mechanism including a hydraulic control valve of the hydraulic booster 20 is separately provided and is used as an anti-lock control.

As above mentioned, the brake fluid pressure is supplied to the wheel cylinder of at least one system and is changed to the output fluid pressure of the dynamic fluid pressure control apparatus by the first changeover valve upon the anti-lock control etc. Further, the wheel cylinder is fluidically communicated with the power fluid pressure source by the second changeover valve upon actuation of the anti-slip control. In these controls, the power fluid pressure is not supplied to the master cylinder upon the change of the communication to the power fluid pressure source by the connection of first and second changeover valves, so that the smooth change actuation can be maintained. In case that one of first and second changeover valves are not actuated, the power fluid pressure of the power fluid pressure source is not supplied to the master cylinder and fail-safe operation is automatically provided in the change actuation.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claims is:

1. A hydraulic brake system for a vehicle, comprising:
    a master cylinder generating a brake fluid pressure in response to actuation of a brake pedal;
    a power fluid pressure source generating a power fluid pressure by increasing a brake fluid to a predetermined pressure force;
    a dynamic fluid pressure control apparatus regulating said power fluid pressure from said power fluid pressure source in response to actuation of said brake pedal;
    wheel cylinders for each wheel of said vehicle fluidically communicated with said dynamic fluid pressure control apparatus and said master cylinder via a plurality of fluid passages to provide an anti-lock control system and an anti-slip control system;
    a first changeover valve fluidically and selectively communicated with at least one system of said wheel cylinders and with at least one of said dynamic fluid pressure control apparatus and said master cylinder;
    a control valve disposed in a fluid passage communicating said first changeover valve and said wheel cylinder and controlling said brake fluid pressure supplied to said wheel cylinder by opening and closing said fluid passage in response to a slip-state of said wheels during braking operation, and
    a control circuit controlling actuation of said control valve and said first changeover valve, and a second changeover valve disposed within a fluid passage communicating said first changeover valve and said dynamic fluid pressure control apparatus and fluidically and selectively communicating said fluid passage with one of said dynamic fluid pressure control apparatus and said power fluid pressure source.

2. A hydraulic brake system as set forth in claim 1, wherein said first and second changeover valves are three-port two-position electromagnetic valves.

3. A hydraulic brake system as set forth in claim 1. wherein said dynamic fluid pressure control apparatus is a hydraulic booster which is fluidically communicated with said master cylinder and boosts said master cylinder in response to said brake pedal so as to provide a power source of said power fluid pressure.

* * * * *